US012469428B1

(12) United States Patent
Sun et al.

(10) Patent No.: US 12,469,428 B1
(45) Date of Patent: Nov. 11, 2025

(54) LOCAL DEMURA ALGORITHMS FOR CORRECTING DISPLAY ARTIFACTS

(71) Applicant: Microsoft Technology Licensing, LLC, Redmond, WA (US)

(72) Inventors: Ruipeng Sun, Pleasanton, CA (US); Chuan Pu, Foster City, CA (US); Wenjun Liao, Sunnyvale, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 18/757,227

(22) Filed: Jun. 27, 2024

(51) Int. Cl.
*G09G 3/20* (2006.01)
*G09G 3/00* (2006.01)

(52) U.S. Cl.
CPC ... *G09G 3/2092* (2013.01); *G09G 2320/0233* (2013.01); *G09G 2320/046* (2013.01); *G09G 2330/10* (2013.01)

(58) Field of Classification Search
CPC ....... G06T 7/0002; G06T 7/0004; G06T 7/11; G06T 2207/30168; G06T 2207/30121; G06T 2207/20021; G06T 2207/20024; G09G 2320/0233; G09G 2320/0693; G09G 3/006; G09G 3/20; G09G 3/2092; G09G 2320/0285; G09G 2320/0626; G09G 2360/16
See application file for complete search history.

(56) References Cited

U.S. PATENT DOCUMENTS 10,681,344 B2 * 6/2020 Zhang ................... G06T 7/0004
2018/0357945 A1 * 12/2018 Tang .................... G09G 3/3225
2020/0013326 A1 * 1/2020 Zheng ...................... G09G 3/20
2020/0143726 A1 * 5/2020 Lv ............................ G09G 3/16
2021/0134221 A1 5/2021 Berget
2022/0036527 A1 * 2/2022 Chu ..................... G06V 10/761
2023/0343303 A1 * 10/2023 Ren ...................... G09G 3/3607
2024/0029215 A1 1/2024 Jiang
2024/0029224 A1 * 1/2024 Jiang ......................... G06T 5/70
2024/0038187 A1 * 2/2024 Wang ..................... G09G 3/006

FOREIGN PATENT DOCUMENTS

CN 110136212 A 8/2019
CN 111491070 A 8/2020
CN 111710277 A * 9/2020 ............... G09G 3/20
CN 114023282 A * 2/2022 ............. G09G 3/006
CN 114495815 A 5/2022
CN 114664209 A 6/2022
WO 2023010625 A1 2/2023

OTHER PUBLICATIONS

Compensation Method and Device of Display Panel (Machine translation of CN 111710277 A) (Year: 2020).*

* cited by examiner

*Primary Examiner* — Xuemei Zheng
(74) *Attorney, Agent, or Firm* — Alleman Hall & Tuttle LLP

(57) ABSTRACT

Implementations of local demura algorithms for correcting display artifacts are provided. One aspect includes a method comprising: receiving image data; segmenting the image data into a plurality of regions of interest; applying a plurality of demura algorithms to the plurality of regions of interest to generate a plurality of corrected regions of interest by at least: applying a first demura algorithm to a first region of interest; and applying a second demura algorithm different from the first demura algorithm to a second region of interest; and generating a corrected image using at least the plurality of corrected regions of interest.

28 Claims, 5 Drawing Sheets

LOCAL DEMURA ALGORITHMS FOR CORRECTING DISPLAY ARTIFACTS

BACKGROUND

Electronic displays are devices that can display visual elements, such as images, video, text, etc., using electronic signals to control arrays of pixels. One category of electronic displays includes flat-panel displays, which utilize various technologies to implement thin and lightweight display devices for use in both consumer and industrial applications. Example technologies for implementing flat-panel displays include liquid-crystal display (LCD), light-emitting diode (LED), organic LED (OLED), quantum dot LED (QLED), and micro-LED (μLED).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Implementations of local demura algorithms for correcting display artifacts are provided. One aspect includes a method comprising: receiving image data; segmenting the image data into a plurality of regions of interest; applying a plurality of demura algorithms to the plurality of regions of interest to generate a plurality of corrected regions of interest by at least: applying a first demura algorithm to a first region of interest; and applying a second demura algorithm different from the first demura algorithm to a second region of interest; and generating a corrected image using at least the plurality of corrected regions of interest.

DETAILED DESCRIPTION

Figure 1:
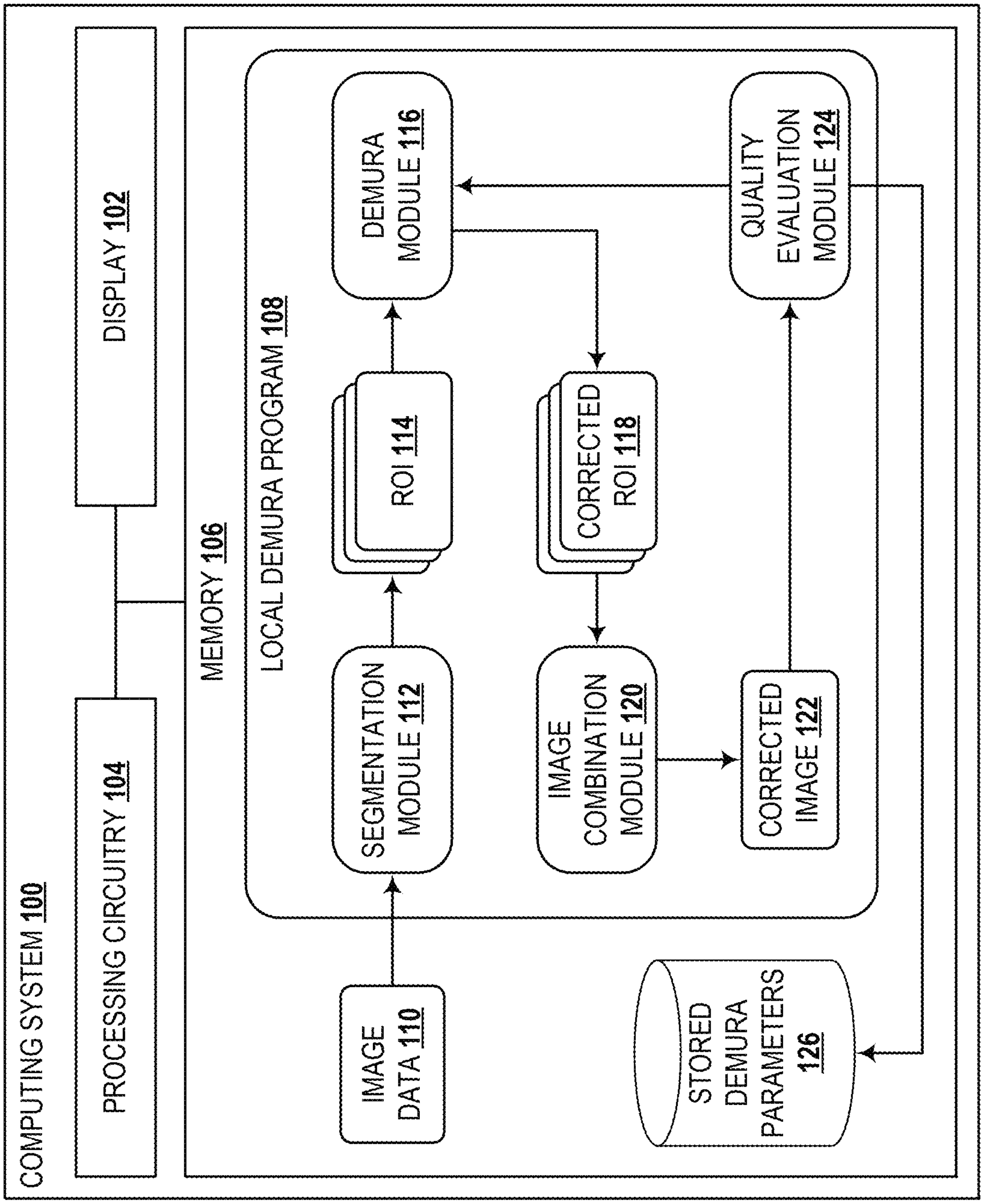
FIG. 1 shows a block diagram of an example computing system capable of implementing a local demura algorithm for the correction of display artifacts.

Flat-panel displays are widely used in various applications, including but not limited to smartphones, tablets, laptops, television (TV) devices, monitors, and augmented reality/virtual reality (AR/VR) displays. However, these displays can often suffer from artifacts (e.g., small display region artifacts). For example, in many emissive displays, such as μLED displays, each pixel emits light and is controlled independently. Even with the same electrical signal input controlling a set of pixels, inconsistent luminance and chromaticity can occur from pixel to pixel (also referred to as "mura"). These variances can result in artifacts that manifest as visual defects that affect the quality and performance of the display, including degradation of image quality and the intended user experience. Furthermore, these artifacts can cause eye fatigue, headache, nausea, and/or motion sickness, especially in AR/VR applications.

One type of display artifact includes brightness non-uniformity, which describes an issue where the luminance of pixels varies across the display panel. Generally, these issues are caused by manufacturing variations and/or aging effects and, as such, are unavoidable in many cases. Another type of artifact includes pixel defects, which are a category of defects where individual pixels are displaying incorrect pixel values. For example, these issues can include occurrences of a pixel being "stuck" at a certain color or brightness level, or not emitting any light at all.

Different methodologies have been contemplated to process and to correct for display artifacts, such as the example artifacts described above. One such methodology includes demura, which refers to in-line correction processes (e.g., during manufacturing and during usage) that adjust the color and/or brightness of each pixel to compensate for display artifacts and to improve the display quality. Demura can be performed at different levels. For example, a global demura algorithm can be implemented to apply a uniform correction to the whole display panel.

Global demura algorithms are techniques widely used in different emissive display technologies for improving the visual quality of the displays by compensating for the non-uniformity of the sub-pixels. However, these algorithms have certain drawbacks that limit their performance and applicability. For example, global filtering or dithering can reduce the image region contrast and modulation transfer function (MTF), which are important metrics for evaluating the sharpness and clarity of the display. Applying a global transformation when there are only small, localized artifacts can adversely affect uniform areas. Moreover, global filtering or dithering can introduce artifacts, such as halo, ringing, or noise, especially in high-contrast or fine-detail regions. These artifacts can degrade the perceived quality and fidelity of the display. As such, implementations of global demura algorithms generally include balancing between reducing brightness non-uniformity and preserving image quality, which can be a challenging task involving careful parameter tuning and optimization. Another type of demura algorithm includes a pixel-level process that applies individual corrections to the color and/or brightness values of each pixel. However, pixel-wise correction methodologies typically involve high computational complexity and large amounts of computing resources. As such, these algorithms can be infeasible for many applications.

In view of the observations above, the present disclosure describes and provides local demura algorithms that can process display artifacts, including artifacts caused by a global demura algorithm. For example, a local demura algorithm can be implemented to process and to correct for brightness and/or color non-uniformity and/or pixel defects. Applying demura at different levels results in different trade-offs. For example, global demura processes are generally simple and fast, but they cannot handle spatially varying artifacts or pixel defects. Pixel-level demura processes can result in the highest quality correction but involve high computational complexity and memory usage. Local demura processes, such as those described herein, provide a compromise between global and pixel-level demura as they can handle spatially varying artifacts with moderate to low complexity and memory usage.

A local demura algorithm can be implemented for the correction of small display region artifacts using a model that adapts to the characteristics of artifacts and the display device. In some implementations, a local demura algorithm is performed to apply corrections to different regions of a display panel. Different corrections can be applied to different regions. As can readily be appreciated, the type of correction applied to a given region can depend on the type of artifact or other any other defect present in the region.

In some implementations, the local demura algorithm implemented includes steps of region of interest (ROI) selection, image processing (e.g., low pass filtering, interpolation, and dithering), and image combination. A ROI selection step can be implemented to identify localized, non-uniform areas in the display panel, such as areas with mura, clouding, banding, burn-in, etc. In the display image processing step, the selected ROI(s) are processed to correct for any detected artifact, which generally includes smoothing out the non-uniform area and the surrounding area to reduce the contrast between the two areas. The image combination step then stitches the processed ROIs together and evaluates the applied effects on the image as a whole. This framework provides several technical advantages for the implementations of demura algorithms, including high quality artifact correction with low computational complexity. Unlike current de-mosaicing methods that tend to blur edges and introduce false colors, the framework described herein can preserve the sharpness and details of the original image. It adapts to the local characteristics of the image, such as brightness, contrast, and color distribution, and applies different interpolation schemes accordingly. Furthermore, the framework generally includes a small number of operations per pixel and can be implemented in parallel on multiple cores or hardware accelerators.

Turning now to the figures, local demura algorithms for correction of display artifacts are illustrated and described in further detail. A local demura algorithm can be implemented on various platforms, including both hardware and software platforms. In some implementations, the algorithm is applied on a flat-panel display to improve the display image quality by correcting the local non-uniformity and/or enhancing the perceived resolution and color depth of the display. The algorithm can be applied to any type of flat-panel display. Examples of flat-panel displays include LCD, LED, OLED, QLED, and μLED.

FIG. 1 shows a block diagram of an example computing system 100 capable of implementing a local demura algorithm for the correction of display artifacts. The example computing system 100 can be implemented with various types of computing devices, including mobile devices, smart phones, personal computers, laptops, computing servers, head-mounted displays, etc. The example computing system 100 includes a display device 102 that may, for at least the reasons discussed in the sections above, suffer from one or more display artifacts such as but not limited to local non-uniformity and pixel defects. Various types of display devices can be implemented. Examples of displays include LCD, LED, OLED, QLED, and μLED. The example computing system 100 can include various other components. For example, the system 100 can include a camera system for capturing the output of the display 102. In some implementations, the example computing system 100 includes a computing device in remote communication (e.g., cloud computing system) with the display device 102.

The example computing system 100 further includes processing circuitry 104 and memory 106 storing instructions that, during execution, causes the processing circuitry 104 to perform the various processes described herein (e.g., performing a local demura algorithm). Local demura algorithms can be performed for a given display, such as display 102, to correct/compensate for display artifacts. In the depicted example, the memory 106 stores a local demura program 108 that includes various modules for performing a local demura algorithm. As display artifacts can result from manufacturing variations, a local demura algorithm can be performed as part of quality assurance for the manufacturing process of the display 102. A local demura algorithm can also be performed periodically (e.g., weekly, monthly, upon every startup of the display, etc.) as display artifacts can also result from usage of the display 102 over time. In some implementations, a local demura algorithm is performed as an in-line process during usage of the display.

Figure 2:
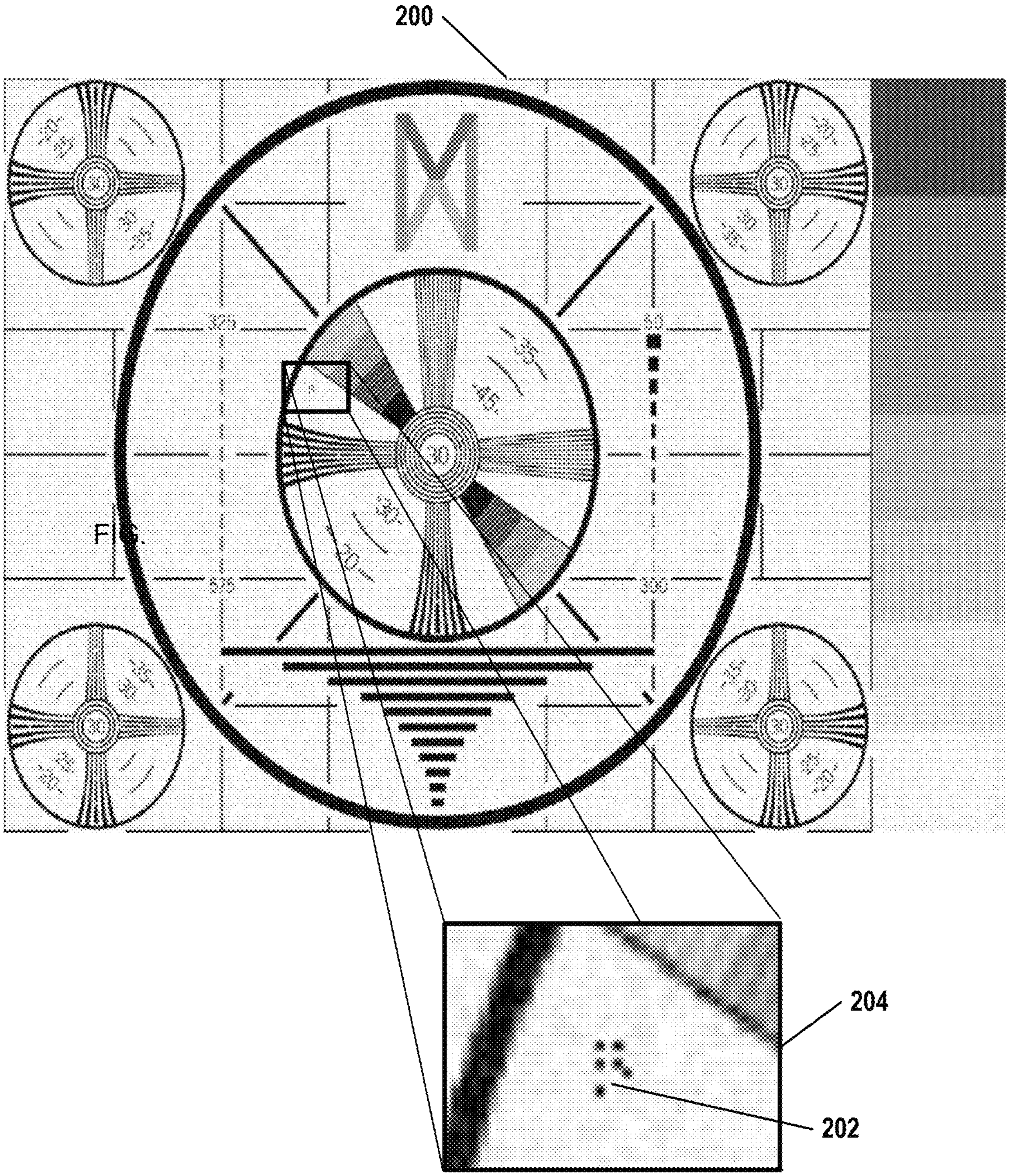
FIG. 2 shows a block diagram of an example local demura algorithm for correcting display artifacts, which can be implemented using the example system of FIG. 1.

FIG. 2 shows an example display image 200 with a localized display artifact 202. The example display image 200 shows a test pattern with various designs and brightness values that can be used to facilitate the detection of display artifacts. As shown in window 204, there are pixel-sized display artifacts 202 displaying values that are non-uniform with their surrounding areas.

Referring back to FIG. 1, the local demura algorithm implemented by the local demura program 108 starts with receiving image data 110 on which the local demura algorithm can be performed. The image data 110 can be of any image format and can be provided from various sources. In some implementations, the image data 110 is a single image retrieved from a video recording of the display device 102. In some implementations, the image data 110 includes an image formed by the display 102 in response to a uniform signal sent across the pixels of the display (e.g., the display is set to display a fixed grayscale level).

The local demura program 108 includes a segmentation module 112 for segmenting the image data 110 into a plurality of regions of interest 114. ROIs 114 can be of any shape and size. In some implementations, the ROIs 114 are rectangular areas. ROI sizes can be chosen to be large enough to capture local features of the image to adequately represent artifacts. However, larger ROI sizes may increase the computational cost and reduce the sharpness of the image. Segmentation of the image data 110 can be performed in various ways. For example, the image data 110 can be segmented manually or using an automated process.

In some implementations, a user manually selects the ROIs 114 (e.g., using a ROI tool to draw around the desired ROI(s) on an image of the image data 110). In other implementations, the image data 110 is segmented using an automatic method. Various automatic methods can be utilized. One method includes segmenting the image data 110 into predetermined segments. For example, an image of the image data 110 can be divided into an N number of ROIs, which can be of similar or different sizes. Another method includes segmenting the image data 110 based on a predetermined criterion. In some implementations, the segmentation module attempts to identify areas with artifacts, such as non-uniform areas, and selects such areas as the ROIs 114. Examples of such artifacts include mura, clouding, banding, and burn-in. The areas can be identified using various segmentation algorithms based on, for example, luminance variance or edge strength. One example method for segmenting the image data 114 using adaptive thresholding, which is a method that adjusts the threshold value for each pixel based on the local statistics of an image, such as the mean and/or standard deviation. This way, the threshold can adapt to different lighting conditions and contrast levels in the image. Other example methods include the use of edge detection and clustering techniques.

The local demura program 108 further includes a demura module 116 for performing local demura on the ROIs 114 to generate a plurality of corrected regions of interest 118. Correction on the ROIs 114 can be performed in various ways. Generally, a local demura algorithm can be applied to smooth out color and brightness values in a ROI and to reduce the contrast between non-uniform areas and their surrounding areas. Various demura algorithms can be implemented. Examples of demura algorithms include measuring and correcting uniformity using a LUT, automatic mura detection based on image reconstruction and differential analysis, image processing for mura compensation, and dithering to reduce quantization error.

In some implementations, a low pass filter can be applied to a ROI to remove high frequency components that can cause non-uniformity. Additionally, an interpolation method can be used to fill in the missing pixels in the ROI with the average values of the neighboring pixels, improving the continuity and consistency of the image in the ROI. Another example demura algorithm includes performing a dithering step to add noise to the ROI, which can increase the perceived resolution and color depth of the ROI and, consequently, the display. For example, a dithering step can be performed using a random or ordered dither matrix, which can assign different noise values to different pixels in the ROI according to a predefined pattern. This can create a more natural and realistic image in the ROI. Dithering can also be applied after the low pass filtering and interpolation steps described above as it can reduce the visibility of quantization errors and color banding that may occur after performing such steps. In some cases, compensating for quantization errors using dither algorithms may reduce image sharpness. As such, in some implementations, a dithering step is applied to areas with a quantization error above a predetermined threshold. Another demura algorithm that can be applied to a ROI includes applying a pixel-by-pixel look-up-table (LUT) correction to certain regions (e.g., edges, back routing wire areas, etc.). A local LUT could save memory and calculations and hence power.

Different local demura algorithms can be applied to different ROIs. In some implementations, a first demura algorithm is applied to a first ROI, and a second demura algorithm different from the first demura algorithm is applied to a second ROI. Different demura algorithms can be algorithms of different types and/or different parameters (e.g., correction strength). In some implementations, the ROIs 114 are processed independently with different parameters to achieve a target image quality. For example, different corrections can be applied to each ROI 114 based on determined parameters. Depending on how the ROIs 114 were segmented, not every ROI 114 would need to be processed. For example, if the image data 110 was partitioned and segmented into a predetermined N number of ROIs, then there would likely be an ROI without a display defect.

In some implementations, a contrast sensitivity function (CSF) is utilized to adjust the correction strength according to the spatial frequency of the ROI to be corrected. The correction strengths of the ROIs 114 can be adjusted such that the ROIs 114 satisfy a similarity criterion. A contrast sensitivity function is a measure of how well the human visual system can perceive different spatial frequencies, which are variations in brightness or color across space. The CSF varies depending on the luminance, contrast, and viewing conditions of the stimulus. The algorithm can avoid over- or under-correcting certain regions that are more or less sensitive to the human eye. For example, a CSF can be used to reduce the noise in low-frequency regions, such as smooth backgrounds, while preserving the details in high-frequency regions, such as edges and textures.

In some implementations, a structural similarity (SSIM) index is utilized to measure the perceptual quality of each ROI and, as such, can be utilized as a similarity criterion. SSIM is based on the assumption that the human visual system is highly adapted to capture structural information in natural scenes, and therefore, structural similarity is a good approximation of perceptual similarity.

The local demura program 108 further includes an image combination module 120 for combining the corrected ROIs 118 into a corrected image 122 that can be evaluated by a quality evaluation module 124. In some implementations, the quality evaluation module 124 evaluates the demura effects of the corrected ROIs 118 directly. If the evaluation satisfies a predetermined criterion, then the corrected ROIs 118 (or corrected image 122) can be utilized for display. Various methods can be utilized for the evaluation process. In some implementations, the evaluation process includes using a SSIM index to measure the perceptual quality of each ROI. In some implementations, a contrast sensitivity function is utilized to adjust the correction strength according to the spatial frequency of each region.

In some implementations, the demura parameters utilized to generate the corrected ROIs 118 are outputted. In the depicted example, the demura parameters are stored 126 in memory 106, which can be utilized for various applications (e.g., future demura corrections). In some implementations, the demura parameters are stored in memory of a device remote to the display device 102. For example, the example computing system 100 can include a cloud computing system in remote communication with the display device 102. The cloud computing system can be implemented to provide remote storage of the demura parameters. Upon request, the demura parameters can be sent and loaded to the display device 102 (or another computing device in local communication with the display device 102). In some implementations, the cloud computing device performs the demura computations described in the sections above.

Figure 3:
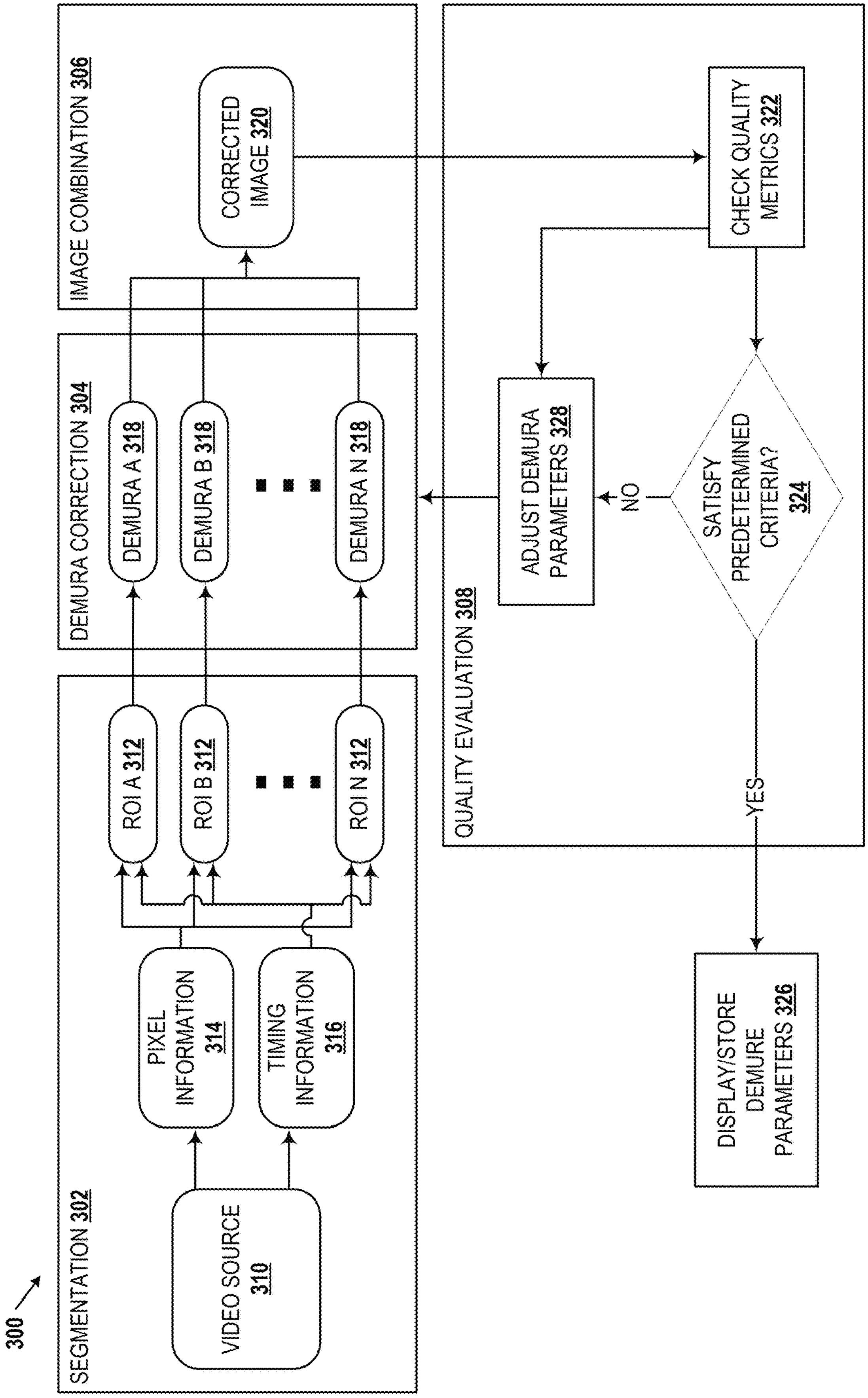
FIG. 3 shows an example display image with a localized display artifact.

Turning now to FIG. 3, a block diagram of an example local demura algorithm 300 for correcting display artifacts is shown. The steps of segmentation 302, demura correction 304, image combination 306, and quality evaluation 308 (as similarly discussed above with respect to FIG. 1) are conceptually illustrated. Generally, demura algorithms can be applied to any pixel-based media, such as images and videos. In the depicted example algorithm 300, the segmentations step 302 processes a video source 310 recorded from a flat-panel display to generate a plurality of regions of interest 312. Any type of video format can be utilized. Furthermore, any number of ROIs can be formed. In the depicted example algorithm 300, an N number of ROIs 312 is formed (i.e., ROI A, ROI B, . . . , ROIN). The ROIs 310 can be defined by pixel information 314 and timing information 316 obtained from the video source 310. Any segmentation method, including those discussed above with respect to FIG. 1, can be utilized. For example, both manual and automated processes can be utilized.

The N number of ROIs 312 are each individually processed by different demura algorithms 318 during the demura correction step 304. As shown, there is a corresponding demura algorithm 318 for each ROI 312, resulting in N number of demura algorithms 318. The demura algorithms 318 can include different algorithms and/or multiples of the same algorithm. Any type of demura algorithm can be utilized, including those discussed above with respect to FIG. 1. The demura algorithms 318 can be determined depending on certain characteristics of their corresponding ROIs 312. For example, a given demura algorithm 318 can include a flow pass filter when its corresponding ROI 312 includes high-frequency components that cause non-uniformity.

After the demura algorithms 318 are applied to their corresponding ROIs 312, the corrected ROIs are stitched together and combined to form a corrected image 320 in the image combination step 306. The corrected image 320 can be used to perform quality evaluation 308 to determine whether the demura algorithms 318 applied are sufficient and that the result satisfies one or more predetermined criteria. Various methods can be utilized to perform the quality evaluation 308. In the depicted example, quality metrics are utilized to determine whether the result satisfies a predetermined criterion. From the corrected image 320, quality metrics (e.g., uniformity, contrast, human perception, etc.) can be checked 322 to determine whether they satisfy one or more predetermined criteria 324 (e.g., whether the corrected ROIs have SSIM indices within a predetermined range).

If the predetermined criteria are satisfied, the result can be output/utilized 326. For example, the corrected image 320 can be output for display in the flat-panel display. Additionally or alternatively, the demura parameters associated with the demura algorithms 318 that were applied to the ROIs 312 can be outputted/stored for use in other applications (e.g., future applications of a local demura algorithm). If the predetermined criteria are not satisfied, the demura correction step 304 can be performed again with different demura parameters. In the depicted example, the demura parameters are adjusted 328 using the quality metrics previously determined 322. For example, if it was determined that a given ROI of the plurality of ROIs 312 was "over" corrected, the demura parameters for the corresponding demura algorithm 318 associated with the given ROI can be adjusted such that the correction strength is lowered.

Figure 4:
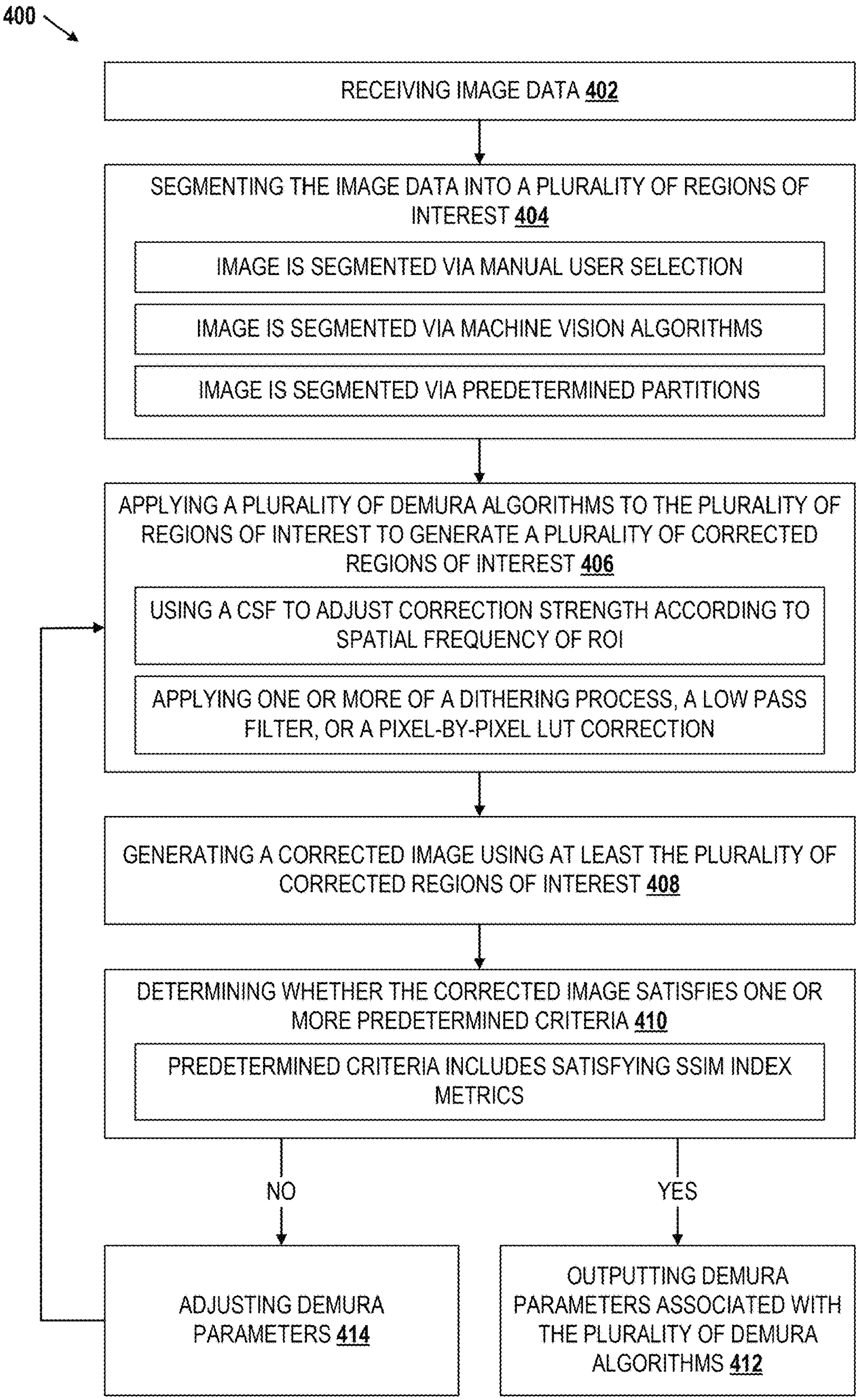
FIG. 4 shows a flow diagram of an example method for correction of display artifacts using local demura algorithms, which can be implemented using the example system of FIG. 1.

FIG. 4 shows a flow diagram of an example method 400 for correction of display artifacts using local demura algorithms, which can be implemented using the example device of FIG. 1. At step 402, the method 400 includes receiving image data. The image data can include one or more images, which can be of any image format. The image data can be provided in various ways. In some implementations, the image data is derived from a video source recording of a flat-panel display. In further implementations, the flat-panel display is in local communications with the device performing the local demura algorithms. In other implementations, the image data is received remotely for processing.

At step 404, the method 400 includes segmenting the image data into a plurality of regions of interest. The image can be segmented using manual or automated methods (or a combination of both). The regions of interest can be of any shape and size, including any polygon and irregular shapes. For example, in some implementations, the image is segmented by manual user selection. Manual user selection can be performed via a ROI selection tool that can include, for example, a boundary drawing tool of a specific polygon (e.g., rectangle) or a freehand drawing tool that can result in irregular shapes. In some implementations, the image is segmented using one or more machine vision algorithms for identifying artifacts. In such cases, the regions of interest can each include at least one identified artifact. The image can include areas not included in the plurality of regions of interest. Examples of artifacts include mura, clouding, banding, and burn-in. Example algorithms for identifying artifacts include adaptive thresholding, edge detection, and clustering techniques. In some implementations, the image is segmented into predetermined partitions. For example, the image can be segmented into N regions of interest. In such cases, not every ROI would necessarily include an artifact. The N regions of interest can be of a similar size. The image can be segmented into any number of ROIs using such methods.

At step 406, the method 400 includes applying a plurality of demura algorithms to the plurality of regions of interest to generate a plurality of corrected regions of interest. Applying the plurality of demura algorithms can be performed in various ways. The plurality of demura algorithms can include different demura algorithms and/or multiples of a similar algorithm. In some implementations, a first demura algorithm is applied to a first region of interest, and a second demura algorithm different from the first demura algorithm is applied to a second region of interest. The plurality of demura algorithms can also be applied with different correction strengths based on, for example, the spatial frequency of the associated region of interest.

Various demura algorithms can be implemented. Examples of demura algorithms include measuring and correcting uniformity using a LUT, automatic mura detection based on image reconstruction and differential analysis, image processing for mura compensation, and dithering to reduce quantization error. In some implementations, a CSF is utilized in accordance with the spatial frequency of a given region of interest to determine the correction strength of a given demura algorithm to be applied to the given region of interest. In some implementations, the plurality of demura algorithms include one or more of a dithering process, a low pass filter, or a pixel-by-pixel look-up-table correction.

At step 408, the method 400 includes generating a corrected image using at least the plurality of corrected regions of interest. The corrected image can be generated in various ways. In some implementations, the regions of interest include the entirety of the image. In such cases, the corrected image can be generated by combining the corrected regions of interest. In other implementations, the corrected regions of interest are combined with the unprocessed areas of the image to generate the corrected image.

At step 410, the method 400 includes determining whether the corrected image satisfies one or more predetermined criteria. Any criterion can be utilized. For example, quality metrics associated with uniformity and/or contrast can be used. In some implementations, the predetermined criterion or criteria include whether the ROIs include structural similarity indices within a predetermined range.

Upon determining that the corrected image satisfies the one or more predetermined criteria, the method 400 includes, at step 412, outputting demura parameters associated with the plurality of demura algorithms. In some implementations, the demura parameters are output and stored for use in future applications. For example, the demura parameters can be saved and utilized when the flat-panel display is operating in the future. The demura parameters can also be used in future local demura algorithms (e.g., as initial parameters for future recalibrations). In some implementations, the resulting corrected image is output for display on the flat-panel display. For example, the local demura algorithm described in method 400 can be performed as an in-line process during operation of the flat-panel display.

Upon determining that the corrected image does not satisfy the one or more predetermined criteria, the method 400 includes, at step 414, adjusting demura parameters. The adjusted parameters can be used to apply the plurality of demura algorithms (or a different set of plurality of demura algorithms) to the plurality of regions of interest to generate an updated plurality of corrected regions of interest. In some implementations, a contrast sensitivity function is utilized to adjust the correction strength according to the spatial frequency of each region of interest. From the updated corrected regions of interest, an updated corrected image can be generated. The process can then continue similarly until the one or more predetermined criteria are satisfied.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
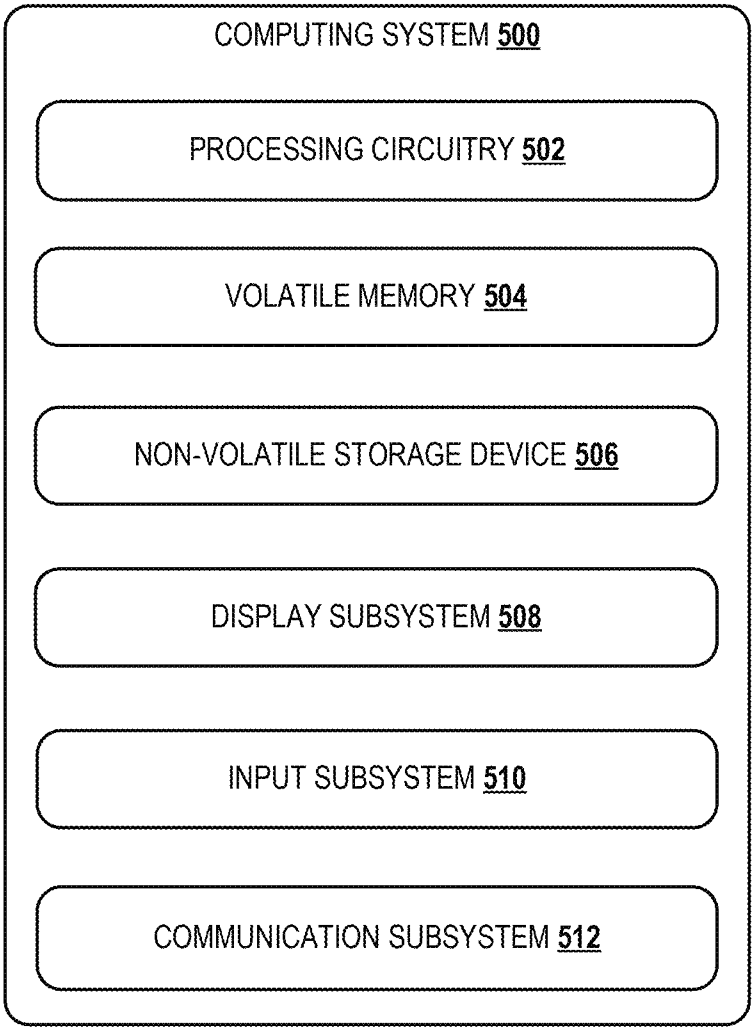
FIG. 5 shows a schematic view of an example computing system, which can be implemented as the computing system of FIG. 1.

FIG. 5 schematically shows a non-limiting embodiment of a computing system 500 that can enact one or more of the methods and processes described above. Computing system 500 is shown in simplified form. Computing system 500 may embody the computing system 100 described above and illustrated in FIG. 1. Components of computing system 500 may be included in one or more personal computers, server computers, tablet computers, home-entertainment computers, network computing devices, video game devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown in FIG. 5.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors configured to execute software instructions. Additionally or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 506 may be transformed—e.g., to hold different data.

Non-volatile storage device 506 may include physical devices that are removable and/or built in. Non-volatile storage device 506 may include optical memory, semiconductor memory, and/or magnetic memory, or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, camera, or microphone.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wired or wireless local- or wide-area network, broadband cellular network, etc. In some embodiments, the communication subsystem may allow computing system 500 to send and/or receive messages to and/or from other devices via a network such as the Internet.

The following paragraphs provide additional description of the subject matter of the present disclosure. One aspect provides a method for performing local demura corrections for processing display artifacts, the method comprising: receiving image data; segmenting the image data into a plurality of regions of interest; applying a plurality of demura algorithms to the plurality of regions of interest to generate a plurality of corrected regions of interest by at least: applying a first demura algorithm to a first region of interest; and applying a second demura algorithm different from the first demura algorithm to a second region of interest; and generating a corrected image using at least the plurality of corrected regions of interest. In this aspect, additionally or alternatively, the method further comprises determining whether the corrected image satisfies one or more predetermined criteria and, upon determining that the corrected image satisfies the one or more predetermined criteria, outputting demura parameters associated with the plurality of demura algorithms. In this aspect, additionally or alternatively, the method further comprises, upon determining that the corrected image does not satisfy the one or more predetermined criteria: adjusting demura parameters associated with the plurality of demura algorithms; applying the plurality of demura algorithms to the plurality of regions of interest using the adjusted demura parameters to generate an updated plurality of corrected regions of interest; and generating an updated corrected image using at least the updated plurality of corrected regions of interest. In this aspect, additionally or alternatively, adjusting the demura parameters comprises adjusting a correction strength of at least one of the demura parameters. In this aspect, additionally or alternatively, the one or more predetermined criteria comprises determining whether structural similarity indices of the plurality of corrected regions of interest are within a predetermined range. In this aspect, additionally or alternatively, each of the plurality of demura algorithms comprises a correction strength derived from a contrast sensitivity function and a spatial frequency of the region of interest to which the demura algorithm is applied. In this aspect, additionally or alternatively, the plurality of demura algorithms comprises one or more of applying a dithering process, applying a low pass filter, or applying a pixel-by-pixel look-up-table correction. In this aspect, additionally or alternatively, segmenting the image data is performed using manual user selection. In this aspect, additionally or alternatively, segmenting the image data is performed using an automatic process comprising one or more of adaptive thresholding, edge detection, or clustering techniques. In this aspect, additionally or alternatively, applying the plurality of demura algorithms further comprises, for each of the plurality of regions of interest, determining whether a display artifact is present, wherein the demura algorithm to be applied to the region of interest is selected based on a type of the determined display artifact.

Another aspect provides a computing system for performing local demura corrections for processing display artifacts, the computing system comprising processing circuitry and memory storing instructions that, during execution, causes the processing circuitry to: receive image data; segment the image data into a plurality of regions of interest; apply a plurality of demura algorithms to the plurality of regions of interest to generate a plurality of corrected regions of interest by at least: applying a first demura algorithm to a first region of interest and applying a second demura algorithm different from the first demura algorithm to a second region of interest; and generate a corrected image using at least the plurality of corrected regions of interest. In this aspect, additionally or alternatively, the instructions, during execution, further causes the processing circuitry to: determine whether the corrected image satisfies one or more predetermined criteria and, upon determining that the corrected image satisfies the one or more predetermined criteria, output demura parameters associated with the plurality of demura algorithms. In this aspect, additionally or alternatively, the instructions, during execution, further causes the processing circuitry to, upon determining that the corrected image does not satisfy the one or more predetermined criteria: adjust demura parameters associated with the plurality of demura algorithms; apply the plurality of demura algorithms to the plurality of regions of interest using the adjusted demura parameters to generate an updated plurality of corrected regions of interest; and generate an updated corrected image using at least the updated plurality of corrected regions of interest. In this aspect, additionally or alternatively, adjusting the demura parameters comprises adjusting a correction strength of at least one of the demura parameters. In this aspect, additionally or alternatively, the one or more predetermined criteria comprises determining whether structural similarity indices of the plurality of corrected regions of interest are within a predetermined range. In this aspect, additionally or alternatively, each of the plurality of demura algorithms comprises a correction strength derived from a contrast sensitivity function and a spatial frequency of the region of interest to which the demura algorithm is applied. In this aspect, additionally or alternatively, the plurality of demura algorithms comprises one or more of applying a dithering process, applying a low pass filter, or applying a pixel-by-pixel look-up-table correction. In this aspect, additionally or alternatively, segmenting the image data is performed using manual user selection. In this aspect, additionally or alternatively, segmenting the image data is performed using an automatic process comprising one or more of adaptive thresholding, edge detection, or clustering techniques.

Another aspect provides a computing system for performing local demura corrections for processing display artifacts, the computing system comprising: a flat-panel display; a camera recording output of the flat-panel display; and processing circuitry and memory storing instructions that, during execution, causes the processing circuitry to: receive a video source of the output of the flat-panel display from the camera, wherein the video source comprises an image; segment the image into a plurality of regions of interest; apply a plurality of demura algorithms to the plurality of regions of interest to generate a plurality of corrected regions of interest by at least: applying a first demura algorithm to a first region of interest and applying a second demura algorithm different from the first demura algorithm to a second region of interest; and generate a corrected image using at least the plurality of corrected regions of interest.

"And/or" as used herein is defined as the inclusive or V, as specified by the following truth table:

| A | B | A ∨ B |
|---|---|---|
| True | True | True |
| True | False | True |
| False | True | True |
| False | False | False |

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for performing local demura corrections for processing display artifacts, the method comprising:
- receiving image data;
- segmenting the image data into a plurality of regions of interest;
- applying a plurality of demura algorithms to the plurality of regions of interest to generate a plurality of corrected regions of interest by at least:
  - applying a first demura algorithm to a first region of interest; and
  - applying a second demura algorithm different from the first demura algorithm to a second region of interest;
- generating a corrected image using at least the plurality of corrected regions of interest;
- determining whether the corrected image satisfies one or more predetermined criteria, wherein the one or more predetermined criteria comprises determining whether structural similarity indices of the plurality of corrected regions of interest are within a predetermined range; and
- upon determining that the corrected image satisfies the one or more predetermined criteria, outputting demura parameters associated with the plurality of demura algorithms.

2. The method of claim 1, further comprising:
- upon determining that the corrected image does not satisfy the one or more predetermined criteria:
  - adjusting demura parameters associated with the plurality of demura algorithms;
  - applying the plurality of demura algorithms to the plurality of regions of interest using the adjusted demura parameters to generate an updated plurality of corrected regions of interest; and
  - generating an updated corrected image using at least the updated plurality of corrected regions of interest.

3. The method of claim 2, wherein adjusting the demura parameters comprises adjusting a correction strength of at least one of the demura parameters.

4. The method of claim 1, wherein each of the plurality of demura algorithms comprises a correction strength derived from a contrast sensitivity function and a spatial frequency of the region of interest to which the demura algorithm is applied.

5. The method of claim 1, wherein the plurality of demura algorithms comprises one or more of applying a dithering process, applying a low pass filter, or applying a pixel-by-pixel look-up-table correction.

6. The method of claim 1, wherein segmenting the image data is performed using manual user selection.

7. The method of claim 1, wherein segmenting the image data is performed using an automatic process comprising one or more of adaptive thresholding, edge detection, or clustering techniques.

8. The method of claim 1, wherein applying the plurality of demura algorithms further comprises:
- for each of the plurality of regions of interest, determining whether a display artifact is present, wherein the demura algorithm to be applied to the region of interest is selected based on a type of the determined display artifact.

9. A computing system for performing local demura corrections for processing display artifacts, the computing system comprising:
- processing circuitry and memory storing instructions that, during execution, cause the processing circuitry to:
  - receive image data;
  - segment the image data into a plurality of regions of interest;
  - apply a plurality of demura algorithms to the plurality of regions of interest to generate a plurality of corrected regions of interest by at least:
    - applying a first demura algorithm to a first region of interest; and
    - applying a second demura algorithm different from the first demura algorithm to a second region of interest;
  - generate a corrected image using at least the plurality of corrected regions of interest;
  - determine whether the corrected image satisfies one or more predetermined criteria, wherein the one or more predetermined criteria comprises determining whether structural similarity indices of the plurality of corrected regions of interest are within a predetermined range; and
  - upon determining that the corrected image satisfies the one or more predetermined criteria, output demura parameters associated with the plurality of demura algorithms.

10. The computing system of claim 9, wherein the instructions, during execution, further cause the processing circuitry to:
- upon determining that the corrected image does not satisfy the one or more predetermined criteria:
  - adjust demura parameters associated with the plurality of demura algorithms;
  - apply the plurality of demura algorithms to the plurality of regions of interest using the adjusted demura parameters to generate an updated plurality of corrected regions of interest; and
  - generate an updated corrected image using at least the updated plurality of corrected regions of interest.

11. The computing system of claim 10, wherein adjusting the demura parameters comprises adjusting a correction strength of at least one of the demura parameters.

12. The computing system of claim 9, wherein each of the plurality of demura algorithms comprises a correction strength derived from a contrast sensitivity function and a spatial frequency of the region of interest to which the demura algorithm is applied.

13. The computing system of claim 9, wherein the plurality of demura algorithms comprises one or more of applying a dithering process, applying a low pass filter, or applying a pixel-by-pixel look-up-table correction.

14. The computing system of claim 9, wherein segmenting the image data is performed using manual user selection.

15. The computing system of claim 9, wherein segmenting the image data is performed using an automatic process comprising one or more of adaptive thresholding, edge detection, or clustering techniques.

16. A method for performing local demura corrections for processing display artifacts, the method comprising:

receiving image data;

segmenting the image data into a plurality of regions of interest, wherein segmenting the image data is performed using an automatic process comprising one or more of adaptive thresholding, edge detection, or clustering techniques;

applying a plurality of demura algorithms to the plurality of regions of interest to generate a plurality of corrected regions of interest by at least:

applying a first demura algorithm to a first region of interest; and applying a second demura algorithm different from the first demura algorithm to a second region of interest; and generating a corrected image using at least the plurality of corrected regions of interest.

17. The method of claim 16, further comprising:

determining whether the corrected image satisfies one or more predetermined criteria; and upon determining that the corrected image satisfies the one or more predetermined criteria, outputting demura parameters associated with the plurality of demura algorithms.

18. The method of claim 17, further comprising:

upon determining that the corrected image does not satisfy the one or more predetermined criteria:

adjusting demura parameters associated with the plurality of demura algorithms;

applying the plurality of demura algorithms to the plurality of regions of interest using the adjusted demura parameters to generate an updated plurality of corrected regions of interest; and generating an updated corrected image using at least the updated plurality of corrected regions of interest.

19. The method of claim 18, wherein adjusting the demura parameters comprises adjusting a correction strength of at least one of the demura parameters.

20. The method of claim 16, wherein each of the plurality of demura algorithms comprises a correction strength derived from a contrast sensitivity function and a spatial frequency of the region of interest to which the demura algorithm is applied.

21. The method of claim 16, wherein the plurality of demura algorithms comprises one or more of applying a dithering process, applying a low pass filter, or applying a pixel-by-pixel look-up-table correction.

22. The method of claim 16, wherein applying the plurality of demura algorithms further comprises:

for each of the plurality of regions of interest, determining whether a display artifact is present, wherein the demura algorithm to be applied to the region of interest is selected based on a type of the determined display artifact.

23. A computing system for performing local demura corrections for processing display artifacts, the computing system comprising:

processing circuitry and memory storing instructions that, during execution, cause the processing circuitry to:

receive image data;

segment the image data into a plurality of regions of interest, wherein segmenting the image data is performed using an automatic process comprising one or more of adaptive thresholding, edge detection, or clustering techniques;

apply a plurality of demura algorithms to the plurality of regions of interest to generate a plurality of corrected regions of interest by at least:

applying a first demura algorithm to a first region of interest; and applying a second demura algorithm different from the first demura algorithm to a second region of interest; and generate a corrected image using at least the plurality of corrected regions of interest.

24. The computing system of claim 23, wherein the instructions, during execution, further causes the processing circuitry to:

determine whether the corrected image satisfies one or more predetermined criteria; and upon determining that the corrected image satisfies the one or more predetermined criteria, output demura parameters associated with the plurality of demura algorithms.

25. The computing system of claim 24, wherein the instructions, during execution, further causes the processing circuitry to:

upon determining that the corrected image does not satisfy the one or more predetermined criteria:

adjust demura parameters associated with the plurality of demura algorithms;

apply the plurality of demura algorithms to the plurality of regions of interest using the adjusted demura parameters to generate an updated plurality of corrected regions of interest; and generate an updated corrected image using at least the updated plurality of corrected regions of interest.

26. The computing system of claim 25, wherein adjusting the demura parameters comprises adjusting a correction strength of at least one of the demura parameters.

27. The computing system of claim 23, wherein each of the plurality of demura algorithms comprises a correction strength derived from a contrast sensitivity function and a spatial frequency of the region of interest to which the demura algorithm is applied.

28. The computing system of claim 23, wherein the plurality of demura algorithms comprises one or more of applying a dithering process, applying a low pass filter, or applying a pixel-by-pixel look-up-table correction.

* * * * *